United States Patent
Lee et al.

(10) Patent No.: US 7,827,427 B2
(45) Date of Patent: Nov. 2, 2010

(54) SYSTEM-ON-CHIP EMBODYING SLEEP MODE BY USING RETENTION INPUT/OUT DEVICE

(75) Inventors: Jae-Young Lee, Yongin-si (KR); Sung-Hoon Cho, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 613 days.

(21) Appl. No.: 11/906,080

(22) Filed: Sep. 28, 2007

(65) Prior Publication Data
US 2008/0082847 A1   Apr. 3, 2008

(30) Foreign Application Priority Data
Sep. 28, 2006   (KR) .................... 10-2006-0094940

(51) Int. Cl.
*G06F 1/32* (2006.01)
(52) U.S. Cl. ...................................... 713/323; 713/320
(58) Field of Classification Search .................. 713/320, 713/323
See application file for complete search history.

(56) References Cited

U.S. PATENT DOCUMENTS

| | | | |
|---|---|---|---|
| 6,337,583 B1 | 1/2002 | Ooishi et al. | |
| 6,617,916 B1 * | 9/2003 | Kurotsu | 327/544 |
| 7,190,187 B2 * | 3/2007 | Hua et al. | 326/27 |
| 7,307,907 B2 * | 12/2007 | Houston | 365/222 |
| 7,383,455 B2 * | 6/2008 | Fernando et al. | 713/300 |
| 7,389,437 B2 * | 6/2008 | Hashidate | 713/323 |
| 7,725,750 B2 * | 5/2010 | Ashish et al. | 713/323 |
| 2006/0053314 A1 | 3/2006 | Hashidate | |

FOREIGN PATENT DOCUMENTS

| | | |
|---|---|---|
| EP | 1 098 239 A1 | 5/2001 |
| JP | 2000-332598 | 11/2000 |
| KR | 2001-0060239 | 7/2001 |
| KR | 10-2006-0043234 | 5/2006 |

* cited by examiner

*Primary Examiner*—Chun Cao
(74) *Attorney, Agent, or Firm*—Mills & Onello, LLP

(57) ABSTRACT

A system-on-chip includes: a controller generating a first input/output control signal determining an input/output state in a normal mode, a second input/output control signal determining the input/output state in a sleep mode, a normal value, and a sleep value; stored in first through fourth registers; a first selector selecting the first or second input/output control signals depending on operation mode; an internal logic circuit operating in the normal mode and generating a signal to be transferred to an external chip based on the normal value; and a second selector selecting an output from the fourth register or the internal logic circuit depending on the operation mode; a power manager controlling the first and second selectors; and a retention input/output device storing outputs of the first and second selectors when the normal mode turns to the sleep mode, which are held when transitioning from the normal to sleep mode.

17 Claims, 7 Drawing Sheets

SYSTEM-ON-CHIP EMBODYING SLEEP MODE BY USING RETENTION INPUT/OUT DEVICE

CROSS-REFERENCE TO RELATED APPLICATIONS

This U.S. non-provisional patent application claims priority under 35 U.S.C. §119 to Korean Patent Application No. 10-2006-0094940 filed on Sep. 28, 2006, the entire contents of which are hereby incorporated by reference.

BACKGROUND

The present invention disclosed herein relates to system-on-chips and more particularly, to a system-on-chip operable in a sleep mode with a retention input/output device.

A system-on-chip (hereinafter, referred to as 'SOC') is generally structured with an awake module (hereinafter, 'power manager') normally turned ON to control ON/OFF of power supplied each of a plurality of internal circuits, and an input/output device for interfacing with external devices out of the SOC.

If the SOC is in a sleep mode, most internal circuits are powered OFF by the power manager. But, external devices coupled to the input/output device of the SOC can not be turned OFF. Thus the input/output device coupled to the external devices is required to maintain its turn-ON state for interface with the external devices and holding a specific value (hereinafter, referred to as 'sleep value'). The sleep value means a signal of constant low or high level for preventing a leakage current from flowing through the input/output device in the sleep mode of the SOC. Hereinafter, the sleep value is considered to be at a low level in general.

The SOC usually needs an additional device for maintaining such a sleep value. The power manager of the SOC includes a register for storing a sleep value and the input/output device includes the awake multiplexer for selecting the sleep value.

Figure 1:
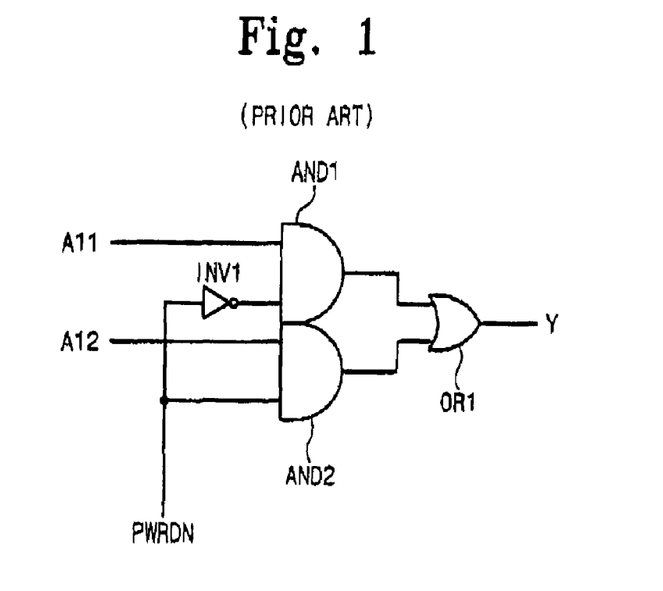
FIG. 1 is a circuit diagram of a prior art awake multiplexer employed in a general input/output device.

FIG. 1 is a circuit diagram of an awake multiplexer employed in a general input/output device.

Referring to FIG. 1, the awake multiplexer employed in the input/output device includes two AND gates AND1 and AND2, an OR gate OR1, and an inverter INV1.

When an SOC is in a normal mode, a control signal PWRDN goes to a low level. The control signal PWRDN having a low level is applied to a second input node of the AND gate AND2. The control signal PWRDN is also inverted to a high level through the inverter INV1. The control signal PWRDN inverted into high level is applied to a second input node of the AND gate AND1. As the AND gate AND2 receives the low level signal at its second input node, it always outputs a low level signal to a second input node of the OR gate OR1 regardless of a value of an input signal A12 corresponding to a sleep value applied to its first input node. As the AND gate AND1 receives the high level signal at its second input node, it outputs a high or low level signal to a first input node of the OR gate OR1 in response to a level (high or low) of an input signal A11 corresponding to a normal value applied to its first input node. Thus, the OR gate OR1 receives the input signal A11 at its first input node and the low level signal at its second input node. As a result, the OR gate OR1 outputs a level of the input signal A11. Thus, the awake multiplexer selectively outputs the input signal A11 when the SOC is in the normal mode and the control signal PWRDN is at a low level.

When the SOC is in a sleep mode, the control signal PWRDN goes to a high level. The control signal PWRDN having a high level makes the awake multiplexer select and output the input signal A12. An operation of the awake multiplexer in the sleep mode of the SOC is reverse of that of the normal mode of the SOC, so will not be further detailed.

In the sleep mode of the SOC, a circuit transferring the input signal A11 is turned OFF. Thus, the first input of the AND gate AND1 of the awake multiplexer is transitioned into a floating state without any further input of the signal A11 corresponding to the normal mode. This floating state is prevented by the AND gate AND1 of the awake multiplexer.

Figure 2:
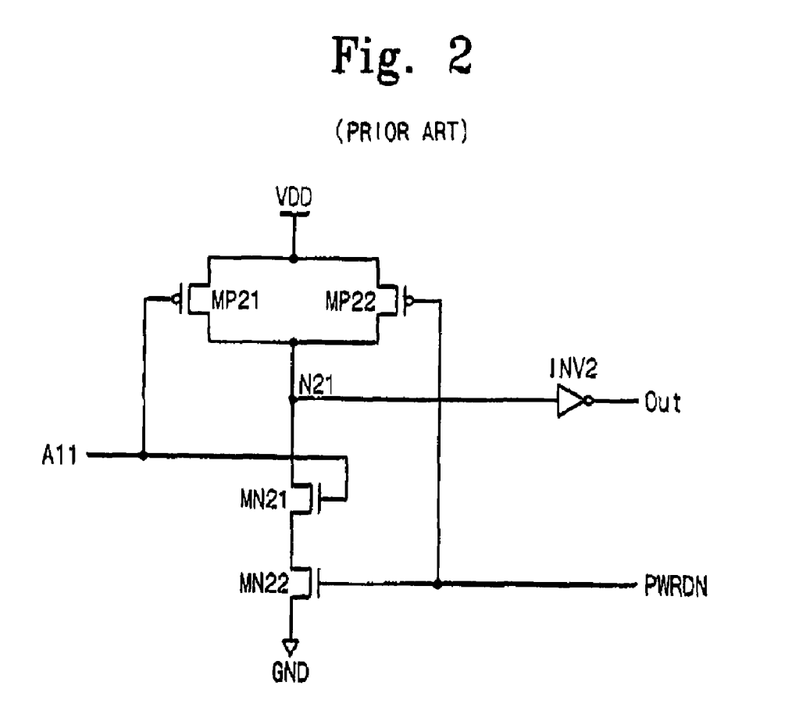
FIG. 2 is a circuit diagram of a prior art AND gate shown in FIG. 1.

FIG. 2 is a circuit diagram of the AND gate shown in FIG. 1.

Referring to FIG. 2, the AND gates, AND1 and AND2, shown in FIG. 1 each includes PMOS transistors MP21 and MP22, NMOS transistors MN21 and MN22, and an inverter INV2. The AND gates AND1 and AND2 are the same in structure, so the description of AND gate AND1 in FIG. 2 applies also AND gate AND2. AND gate AND1 is merely used as an example in FIG. 2.

Sources of the PMOS transistors MP21 and MP22 are connected to an operation voltage VDD in common. A gate of the PMOS transistor MP21 is coupled to the input signal A11 and connected to a gate of the NMOS transistor MN21. A drain of the PMOS transistor MP21 is connected to a drain of the NMOS transistor MN21. An output node of the inverter INV2 is an output node OUT of the AND gate AND1. The input signal A11 is applied to the first input node of the AND gate AND1 and the control signal PWRDN is applied to the second input node of the AND gate AND1.

A gate of the PMOS transistor MP22 is coupled to the control signal PWRDN. A drain of the PMOS transistor MP22 is connected to the drain of the NMOS transistor MN21. A source of the NMOS transistor MN21 is connected to a drain of the NMOS transistor MN22. A gate of the NMOS transistor MN22 is coupled to the control signal PWRDN. A source of the NMOS transistor MN22 is connected to a ground GND.

When the SOC is in the normal mode, the control signal PWRDN becomes at a low level. The control signal PWRDN of low level is inverted into a high level. The control signal PWRDN inverted into a high level turns the NMOS transistor MN22 of the AND gate AND1 ON and turns the PMOS transistor MP22 OFF. During this, if the input signal A11 is at a high level, the PMOS transistor MP21 is turned OFF while the NMOS transistor MN21 is turned ON. Thus, a current through the NMOS transistors MN21 and MN22 flows into the ground GND and a voltage of a node N21 falls down to a low level. This low level voltage is converted into and output as a high level signal through the inverter INV2. If the input signal A11 is at a low level, the AND gate AND1 outputs a low level signal. An operation with the input signal A11 of low level is reverse of that when the input signal A11 is at a high level, so will not be further detailed. Thus, in the normal mode of the SOC, the awake multiplexer selects and outputs the input signal A11 in correspondence with the normal value when the control signal PWRDN is at a low level.

Referring to the description relevant to FIG. 1, when the SOC is in the sleep mode, the control signal PWRDN is high level. The control signal PWRDN of a high level enables the awake multiplexer to select and output the signal A12 corresponding to the sleep value. After outputting the signal A12, a circuit transferring the input signal A11 is turned OFF because the SOC is in the sleep mode. Thus, the first input node of the AND gate AND1 of the awake multiplexer is floated when receiving the input signal A11 corresponding to the normal mode. But the AND gate AND1 receives the inverted control signal /PWRDN of a low level through the inverter INV1 and then the NMOS transistor MN22 is transitioned into an open state to the ground GND by the inverted control signal /PWRDN having a low level. Further, the PMOS transistor MP22 is turned ON to hold the node N21 at a high level. The high level signal of the node N21 is inverted into a low level signal through the inverter INV2. As an output of the AND gate AND1 maintains the low level signal regardless of a state of the input signal A11, the awake multiplexer is able to interrupt a leakage current from preventing a floating state.

The SOC includes at least one or more buffers for transferring a sleep value to the awake multiplexer of the input/output device from a register of the power manager. The sleep value stored in the register of the power manager is transferred to the awake multiplexer of the input/output device through the buffer. The register of the power manager and the awake multiplexer of the input/output device need to be continuously supplied with power in order to maintain a sleep value during the sleep mode of the SOC. Therefore, the awake multiplexer is included in the input/output device for maintaining an ON-state even during the sleep mode, and supplied with power.

The input/output device includes a plurality of input/output cells, and the awake multiplexer is usually placed at a front of the input/output cell. Thus, as the number of the input/output cells gets larger, the number of the awake multiplexers used in the input/output device increases to enlarge a size of the input/output device. If the input/output device is enlarged in size, a rate of power consumption by the input/output device becomes higher. increasing an amount of leakage current therein. With the larger number of the awake multiplexers of the input/output device, the number of the buffers for connecting the registers of the power manager to the awake multiplexers of the input/output device is also increased. Because there are so many buffers, an amount of leakage current further increases accordingly. Additionally, the power manager is enlarged in size by including the register for storing a sleep value, so that a rate of power consumption becomes higher, and there is a corresponding increase in leakage current.

Therefore, the SOC including such a general input/output device is disadvantageous to power consumption and leakage current because it causes a real extension of a circuit supplying power for holding a specific value in the sleep mode.

SUMMARY OF THE INVENTION

In accordance with the present invention, provided is a SOC with a retention input/output device helpful to lower power when the SOC is in a sleep mode.

Also in accordance with the present invention, provided is a retention input/output device capable of reducing a leakage current in a SOC.

In accordance with one aspect of the present invention, provided is a system-on-chip including: a controller configured to generate a first input/output control signal to determine an input/output state in a normal mode, a second input/output control signal to determine the input/output state in a sleep mode, a normal value, and a sleep value; a first register configured to store the first input/output control signal; a second register configured to store the second input/output control signal; a third register configured to store the normal value; a fourth register configured to store the sleep value; a first selector configured to select an alternative one from the first and second input/output control signals in accordance with an operation mode; an internal logic circuit configured to operate in the normal mode under the control of the controller and to generate a signal to be transferred to an external chip in response to the normal value from the third register; a second selector configured to select an alternative one from outputs the fourth register and the internal logic circuit in accordance with the operation mode; a power manager configured to control the first and second selectors; and a retention input/output device configured to store outputs of the first and second selectors in response to the power manager when the normal mode turns to the sleep mode. The input/output state of the retention input/output device is held by the output of the first selector when the normal mode transitions to the sleep mode.

The retention input/output device can comprise an input/output pad that is driven by the output of the second selector when the retention input/output device has an output state prior to the sleep mode.

The first, second, third, and fourth registers can be included in an off region and not provided power from power supply in the sleep mode.

The first, second, third, and fourth registers can be included in an on region and provide power from the power supply in the sleep mode.

The on region is internal to the power manager.

The first, second, third, and fourth registers can be included in the power manager, where the signals and values stored therein can be required in connection with wakeup.

The power manager can be configured to generate a power control signal, latch values input from the first and second selectors before the sleep mode when the normal mode transitions to the sleep mode, and controls the retention input/output device to generate a predetermined level signal.

The retention input/output device can include an input/output cell controlled with the input/output state by the first and second input/output control signals.

The input/output cell can includes: an input/output pad; a first latch configured to latch the output of the first selector transferred through a first level shifter; a second latch configured to latch the output of the second selector transferred through a second level shifter; and a buffer controlled by a value of the first latch, and configured to transfer a value of the second latch to the input/output pad.

Each of the first and second latches can be configured to bypass or store an output of the corresponding level shifter in correspondence with the power control signal.

Each the first and second latches can be configured to bypass an output of the corresponding level shifter in the normal mode.

Each the first and second latches can be configured to latch an output of the corresponding level shifter in the sleep mode.

The first and second level shifters can be configured to generate predetermined level signals from the power control signal when the normal mode transitions to the sleep mode.

The first and second selectors, the internal logic circuits, and the controller can be configured to be interrupted with power from the power manager when in the sleep mode.

In accordance with another aspect of the present invention, provided is a system-on-chip comprising: a plurality of input/output devices, comprising at least one retention input/output device and at least one non-retention input/output device; a power manager configured to generate two or more power control signals configured to control the plurality of input/output devices; and at least one selector configured to select from among the two or more power control signals in accordance with an operation mode, including a normal mode and a sleep mode. The at least one retention input/output device is configured to store outputs of the at least one selector to maintain an input/output state of the at least one retention input/output device when the normal mode transitions to the sleep mode.

The two or more power control signals can comprise a plurality of power control signals having different voltage levels, and each of the plurality of input/output devices can be configured to receive one of the power control signals having an appropriate power level.

The system-on-chip can further comprise a level shifter interposed between two input/output devices from the plurality of input/output devices, through which a power control signal configured to control one of the two input/output devices can be transferred to the other of the two input/output devices.

BRIEF DESCRIPTION OF THE FIGURES

Non-limiting and non-exhaustive embodiments in accordance with the present invention will be described with reference to the following figures, wherein like reference numerals refer to like parts throughout the various figures unless otherwise specified. In the figures.

DETAILED DESCRIPTION OF PREFERRED EMBODIMENTS

Preferred embodiments in accordance with the present invention will be described below in more detail with reference to the accompanying drawings. The present invention can, however, be embodied in different forms and should not be constructed as limited to the embodiments set forth herein. Like reference numerals refer to like elements throughout the accompanying figures.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Hereinafter, exemplary embodiments in accordance with the present invention will be described in conjunction with the accompanying drawings.

Figure 3A:
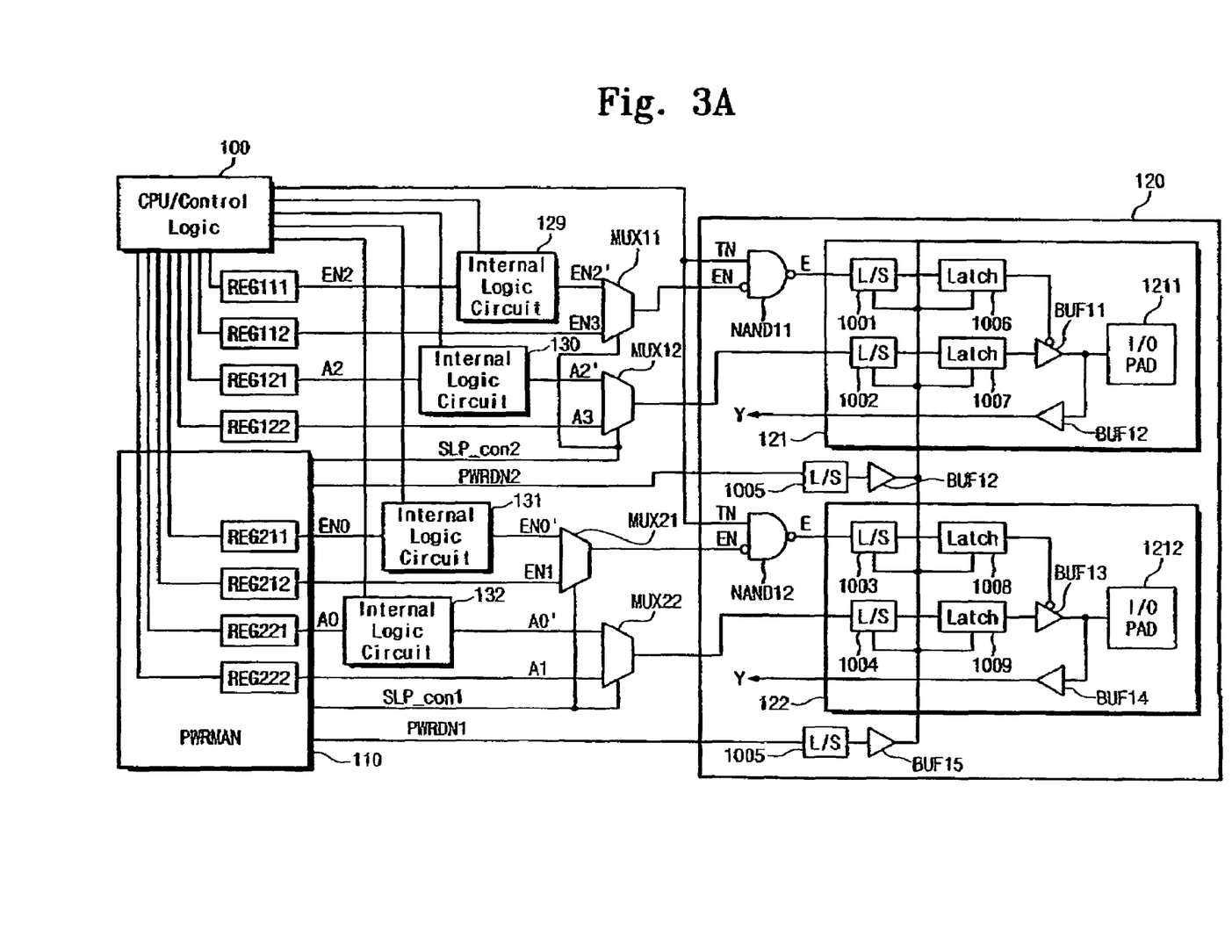
FIG. 3A is a block diagram illustrating an embodiment of a retention input/output device and a power manager in accordance with an aspect of the present invention.

FIG. 3A is a block diagram illustrating an embodiment of a retention input/output device and a power manager in accordance with aspects of the present invention.

Referring to FIG. 3A, the retention input/output device 120 is comprised of input/output cells 121 and 122, NAND gates NAND11 and NAND12, a level shifter 1005, and a buffer BUF15.

Each input/output cell operates to input an external signal or to output an internal signal. Since the input/output cells 121 and 122 are configured to have the same structure, hereinafter will be described only the input/output cell 122, as an example.

The input/output cell 122 includes level shifters 1003 and 1004, latches 1008 and 1009, buffers BUF13 and BUF14, and an input/output pad 1212.

The power manager 110 includes a plurality of registers REG211, REG212, REG221, and REF222 (REG211~REG222). Another plurality of registers REG111, REF112, REG121, and REG122 (REG111~REG122) are disposed at an off region, outside of the power manager 110. That is, "off block" or "off region" means external to the power manager 110, while "on block" or "on region" means internal to the power manager 110. The registers REG111, REG112, REG211, and REG212 store their corresponding values of control signals EN3, EN2, EN1, and EN0, respectively, for setting input/output states of the input/output cells 121 and 122. The registers REG121, REG122, REG221, and REG222 store their corresponding normal or sleep values.

A central processing unit (CPU)/control logic block 100 (hereinafter, referred to as 'controller') sets the values (the normal or sleep values, or the control signals EN3~EN0) corresponding each to the registers REG111~REG122 and REG211~REG222 when the system (i.e., the SOC) is in a normal mode. As the input/output cell 122 is described as a representative of the input/output cells, for correspondence in operation, hereinafter is just explained about the registers REG211~REG222 (i.e., REG211, REG212, REG221, and REG222) for storing the normal or sleep values provided to the input/output cell 122 and the control signals EN0 and EN1 to determine input/output states of the input/output cell 122.

The register REG211 stores the control signal EN0 and the register REG212 stores the control signal EN1. The register REG221 stores a normal value A0 and the register REG222 stores a sleep value A1. The control signal EN0 stored in the register REG211 is transferred to an internal logic circuit 131. When the system is in the normal mode, the internal logic circuit 131 is operated in the normal mode by the controller 100. The internal logic circuit 131 operating in the normal mode receives the control signal EN0 and generates a control signal EN0', which is to control an input/output state of the input/output cell 122 of the retention input/output device 120, in response to the control signal EN0.

The control signal EN0' is applied to a multiplexer MUX21. The multiplexer MUX21 receives the control signal EN0' and the control signal EN1 from the register REG212.

The normal value A0 stored in the register REG221 is used for an instruction signal for transceiving data with an external chip connected to the internal logic circuit 131 through the retention input/output device 120. The sleep value A1 is a signal of a constant low or high level that is maintained to prevent a leakage current in the retention input/output device 120 when the SOC is in the sleep mode. In this embodiment, the sleep value A1 generally means a low level signal (it will be detailed with reference to FIG. 4).

When the system is in the normal mode, the internal logic circuit 132 is operated in the normal mode by the controller 100. The internal logic circuit 132 operating in the normal mode receives the normal value A0 from the register REG221 and transceives data with an external chip connected thereto through the retention input/output device 120. In transmitting data, the internal logic circuit 132 generates a signal A0' for transmitting the data to an external chip connected to the retention input/output device 120.

The signal A0' is transferred to a multiplexer (second selector) MUX22. The multiplexer MUX22 receives the signal A0' and the sleep value A1 from the register REG222.

The multiplexer MUX21 selects the control signal EN0' in the normal mode of the system, in response to a selection signal SLP_con1 generated from the power manager 110, and selects the control signal EN1 when the system turns to the sleep mode from the normal mode. The control signal EN0 selected thereby is transferred to a second input node of the NAND gate NAND12 of the retention input/output device 120.

The multiplexer MUX22 selects the signal A0' to be output to an external chip in the normal mode of the system, in response to the selection signal SLP_con1 generated from the power manager 110, and selects the sleep value A1 when the system turns to the sleep mode from the normal mode. The selected signal A0' or A1 is transferred to the level shifter 1004 of the retention input/output device 120. The level shifter 1004 converts a voltage level of its input signal into a voltage level of the retention input/output device 120 (hereinafter detailed) and provides the converted signal to the latch 1009. The latch 1009 bypasses or stores its input signal using the control signal PWRDN1 generated from the power manager 110, which will be detailed with reference to FIG. 6.

The NAND gate NAND12 of the retention input/output device 120 receives a control signal TN from the controller 100 through its first input node and receives an inverted control signal /EN, which is selected by the multiplexer MUX21, through its second output node. The NAND gate NAND12 logically combines the two control signals TN and/EN and provides the logically combined control signal E to the level shifter 1003.

The level shifter 1003 is supplied with an internal voltage (e.g., an operation voltage of the controller 100), although not shown, along with an operation voltage of the retention input/output device 120, and converts a voltage level of the control signal E into the operation voltage level of the retention input/output device 120. For instance, if the operation voltage of the controller 100 is 1.2V, the high level of the signals generated from the controller 100 becomes 1.2V. During the normal mode, the control signal Y is put at a high level and the control signal output from the NAND gate NAND12 becomes the operation voltage level of the controller 100 from logically combining the control signals TN and EN. If the operation voltage of the retention input/output device 120 is 3.3V, the retention input/output device 120 can identify an input high level signal as a low level signal. In order to prevent such problem of misidentification, the retention input/output device 120 converts a high level signal of 1.2V, which is input from the level shifter 1003, into a high level signal of 3.3V that is the operation voltage level thereof.

The control signal E converted in voltage level through the level shifter 1003 is provided to the buffer BUF13 by way of the latch 1008 and the buffer BUF13 is turned ON or OFF by the control signal E.

When the system is operating in the normal mode, the input/output cell 122 of the retention input/output device 120 functions to input or output a signal by the ON or OFF operation of the buffer BUF13. When the system is operating in the normal mode, the input/output cell 122 of the retention input/output device 120 holds the just previous state of the sleep mode by the ON or OFF operation of the buffer BUF13.

As an example, if the system is transitioned into the normal mode and the buffer BUF13 is turned ON by the control signal E, the input/output cell 122 of the retention input/output device 120 operates to output a signal. If the buffer BUF13 is turned OFF by the control signal E, the input/output cell 122 of the retention input/output device 120 operates to input a signal.

During this, if the system turns to the sleep mode from the normal mode, a value of the control signal E controlling the ON and OFF operation of the buffer BUF13 is stored in the latch 1008 and the buffer BUF13 holds its turn ON- or OFF-state of the normal mode in response to the control signal E stored in the latch 1008 (detailed with reference to FIG. 4).

The control signal TN maintains its high level when the multiplexer MUX21 selects the control signal EN0' and EN1. Thus, a voltage level of the control signal E becomes an inverted voltage level of the control signal EN selected by the multiplexer MUX21. Thus, substantially, the buffer BUF13 is turned ON or OFF in response to the control signal EN selected by the multiplexer MUX21 and the input/output cell 122 determines an input/output state by the ON/OFF operation of the buffer BUF13.

The power manager 110 generates the control signal PWRDN1 and transfers the control signal PWRDN1 to the retention input/output device 120. The level shifter 1005 of the retention input/output device 120 converts a voltage level of the control signal PWRDN into the operation voltage level (or power source voltage level) of the retention input/output device 120. The level-converted control signal PWRDN1 is applied to the level shifters 1003 and 1004 and the latches 1008 and 1009 of the input/output cell 122. When the system is in the normal mode, the control signal PWRDN1 becomes inactive, to be a low level signal. When the system is in the sleep mode, the control signal PWRDN1 becomes active to be a high level signal. The control signal PWRDN1 functions to control the level shifters 1003 and 1004 so they are not floated when the internal operation voltages supplied to the level shifters 1003 and 1004 are powered OFF, and determines whether to bypass or store data input from the latches 1008 and 1009.

When the system is operating in the normal mode, the multiplexer MUX21 selects the control signal EN0' provided from the internal logic circuit 131 by the selection signal SLP_con1 generated from the power manager 110. The selected control signal EN is transferred to the second input node of the NAND gate NAND12 of the retention input/output device 120. The NAND gate NAND12 of the retention input/output device 120 receives the control signal TN from the controller 100 through its first input node, and receives the control signal EN inverted.

The NAND gate NAND12 logically combines the control signals TN and/EN input thereto, and provides the logically combined control signal EN to the level shifter 1003. The level shifter 1003 converts a voltage level of the logically combined control signal E into the operation voltage level of the retention input/output device 120, and provides the level converted control signal E to the buffer BUF13 through the latch 1009. During this, the latch 1008 bypasses the control signal E input by the control signal PWRDN1 generated from the power manage 110. The buffer BUF13 is turned ON or OFF in response to the control signal E. According to an ON or OFF state of the buffer BUF13, the input/output cell 122 if the retention input/output device 120 operates to input or output a signal or data.

For instance, if the control signal E is at a low level, the buffer BUF13 is turned ON and then the input/output cell 122 outputs data from the internal logic circuit 132 to an external chip (not shown). If the control signal E is at a high level, the buffer BUF13 is turned OFF and then the input/output cell 122 inputs data from an external chip (not shown) into one of the internal logic circuits.

When the system is operating in the normal mode, the internal logic circuit 132 receives the normal value from the register REG221 and generates the signal A0' to be transferred to an external chip through the retention input/output device 120 in response to the normal value input thereto. The signal A0' from the internal logic circuit 132 is applied to the multiplexer MUX22. The multiplexer MUX22 receives the signal A0' and receives the sleep value A1 from the register REG222.

The multiplexer MUX22 selects the signal A0' by the selection signal SLP_con1 generated from the power controller 110 and transfers the selected signal A0' to the retention input/output device 120. The retention input/output device 120 converts a voltage level of the signal A0' into the operation voltage level of the retention input/output device 120 through the level shifter 1004 of the input/output cell 122 of the retention input/output device 120. If the buffer BUF13 is turned ON by the control signal E, the level converted signal A' is provided to the input/output pad 1212 through the latch 1009 and buffer BUF13. The input/output pad 1212 outputs the signal A0' to an external chip.

If the buffer BUF13 is turned OFF by the control signal E, the input/output cell 122 operates to input a signal and the level converted signal A0' is not output to an external chip. As the input/output cell 122 functions as an input terminal, a signal transferred from an external chip is input through the input/output pad 1212. The signal input through the input/output pad 1212 from an external chip is transferred to one of the internal logic circuits by way of the buffer BUF14.

If the system turns to the sleep mode from the normal mode, the multiplexer MUX21 selects the control signal EN1, which is stored in the register REG212, by the selection signal SLP_con1 generated from the power manager 110 and transfers the selected control signal EN1 to the second input node of the NAND gate NAND12 of the retention input/output device 120.

The NAND gate NAND12 of the retention input/output device 120 receives the control signal TN from the controller 100 through its first input node and receives the inverse of the control signal EN through its second input node. Thereafter, as the system is in the sleep mode, the controller 100, the multiplexer MUX21, and the internal logic circuit 131 are turned OFF because there is no power supplied thereto.

The NAND gate NAND12 logically combines the control signals TN and/EN input thereto and provides the logically combined control signal E to the level shifter 1003. The level shifter 1003 converts a voltage level of the control signal E into the operation voltage level of the retention input/output device 120 and stores the level converted control signal E in the latch 1008 by the control signal PWRDN1 generated from the power manager 110. The control signal E stored in the latch 1008 enables the buffer BUF13 to hold its ON/OFF state.

For example, when the system is operating in the normal mode and the buffer BUF13 is turned ON, the input/output cell 122 functions to output a signal (as an output terminal). If the input/output cell 122 operates as an output terminal and the system turns to the sleep mode from the normal mode, the buffer BUF13 maintains an ON-state by the control signal E and the input/output cell 122 maintains an output state. If the system is operating in the normal mode and the buffer BUF13 is turned OFF, the input/output cell 122 operates as an input terminal. If the input/output cell 122 operates as an input terminal and the system turns to the sleep mode from the normal mode, the buffer BUF13 holds an OFF state by the control signal E and the input/output cell 122 maintains an input state.

When the system is in the sleep mode, the multiplexer MUX22 selects the sleep value A1, which is stored in the register REG222, using the selection signal SLP_con1 generated from the power manager 110 and transfers the selected sleep value A1 to the retention input/output device 120. Thereafter, the internal logic circuit 132 and the multiplexer MUX22 are turned OFF because there is no power supply in the sleep mode of the system. The retention input/output device 120 converts a voltage level of the sleep signal A1 into the operation voltage level thereof and provides the level converted sleep value A1 to the latch 1009. The latch 1009 stores the sleep value A1 by the control signal PWRDN1 generated from the power manager 110. Thus, the sleep value A1 maintains its value because it is stored in the latch 1009 of the retention input/output device 120, which is turned ON during the sleep mode of the system. The sleep value A1 is particularly helpful for reducing a leakage current of the input/output cell 122 of the output state when the buffer BUF13 is held in an ON-state by the control signal E stored in the latch 1008, which will be detailed with reference to FIG. 4.

During this, as the system is in the sleep mode, there is no supply of the internal operation voltages to the level shifters 1003 and 1004 of the input/output cell 122.

Since there is no supply of the internal operations voltages to the level shifters 1003 and 1004, inputs of the level shifters are not floated. In the sleep mode of the system, the floating input states of the level shifters 1003 and 1004 are prevented by the control signal PWRDN1 generated from the power manager 110, which will be detailed with reference to FIG. 5.

If the system turns to the normal mode from the sleep mode, the controller 100 generates the control signals EN0 and EN1, the normal value A0, and the sleep value A1. The control signals EN0 and EN1, the normal value A0, and the sleep value A1 are stored in the registers REF211, REG212, REG221, and REG222 (REG211~REG222) corresponding thereto, respectively. During this, the control signal PWRDN1 from the power manager 110, for controlling the retention input/output device 120, is inactivated after storing the control signals EN0 and EN1, the normal value A0, and the sleep value A1—each in their corresponding registers REG211~REG222. Thus, the registers REG211~REG222 can be disposed in an off region, which is outside of the power manager 110, and powered OFF in the sleep mode of the system. The registers REG211~REG222 of the off region are turned OFF in the sleep mode of the system, but turned ON to be set to their corresponding values EN0, EN1, A0, and A1 by the controller 100 if the system turns to the normal mode from the sleep mode. After then, the control signal PWRDN1 is inactivated. It is, therefore, permissible to locate the registers REG211~REG222 in the off region out of the power manager 110, in various embodiments.

But in the case that the control signal PWRDN1 is activated before storing the control signals EN0 and EN1, the normal value A0, and the sleep value A1 into the corresponding registers REG211~REG222 by the controller 100, the registers REG211~REG222 must be included in the power manager 110 and provide their stored values to the retention input/output device 120 for operating the retention input/output device 120 using the inactivated control signal PWRDN1.

The registers REG111~REG122 illustrated in the embodiment of FIG. 3A are included in the off region outside of the power manager 110 that is powered OFF when the system is in the sleep mode.

However, it is not always permissible to include the registers in the off region. According to functional conditions, the register REG221 that stores the normal value A0 and the register REG222 that stores the sleep value A1 can be placed in the power manager 110, and thus normally maintains its ON state. For instance, if the normal and sleep values A0 and A1 are simultaneously required for turning the system to the normal mode or conducting functions relevant to wakeup, the registers REG221 and REG222 for storing the normal and sleep values A0 and A1 must be included in the power manager 110. As the power manager 110 includes the registers REG221 and REG222 for storing the normal and sleep values A0 and A1, the control signals EN0 and EN1 for controlling an input/output state of the input/output cell 122 receiving the sleep value A1 or the signal A0' corresponding to the normal value A0 must be provided to the input/output device 120 from the power manager 110, when normally turned ON. Thus, the registers REG211 and REG212 for storing the control signals EN0 and EN1, respectively, are required to be included in the power manager 110.

As illustrated in FIG. 3A, since the values stored in the registers REG211, REG212, REG221, and REG222 (i.e., REG211~REG222) are involved in a wakeup operation of the system, those registers are included in the power manager 110. Otherwise, since the registers REG111, REG112, REG121, and REG122 (i.e., REG111~REG122) do not store the values relevant to the wakeup operation of the system, those registers need not to be included in the power manager 110.

As the registers REG211~REG222 are included in the power manager 110 that is always ON, while the registers REG111~REG122 are included in the off region outside of the power manager 110, control signals SLP_con2 and PWRDN2 are generated to agree with operational timings of the input/output cell 121 for the registers REG111~REG122 disposed in the off region outside of the power manager 110.

As a result, if the values stored in the registers REG111~REG122 are irrelevant to the wakeup operation, the registers REG111~REG122 are included in the off region outside of the power manager 110.

As the retention input/output device 120 is required to be normally supplied with power, but without an awake multiplexer for preventing a floating input state, it is possible to use the general multiplexers MUX21 and MUX22 in the off region outside of the retention input/output device 120.

The retention input/output device 120 stores the sleep value A1 from the register REG222 into the latch 1009 thereof when the system is in the sleep mode, so that it is possible to hold the sleep value A1 during the sleep mode of the system even though the register REG222 is placed in the off region outside of the power manager 110.

Therefore, since the retention input/output device 120 is formed without an awake multiplexer and the power manager 110 is formed without the registers REG111~REG122, it reduces a size of a circuit for maintaining an ON state in the sleep mode of the system. As a result, it decreases power consumption and leakage current in the sleep mode of the system.

Figure 3B:
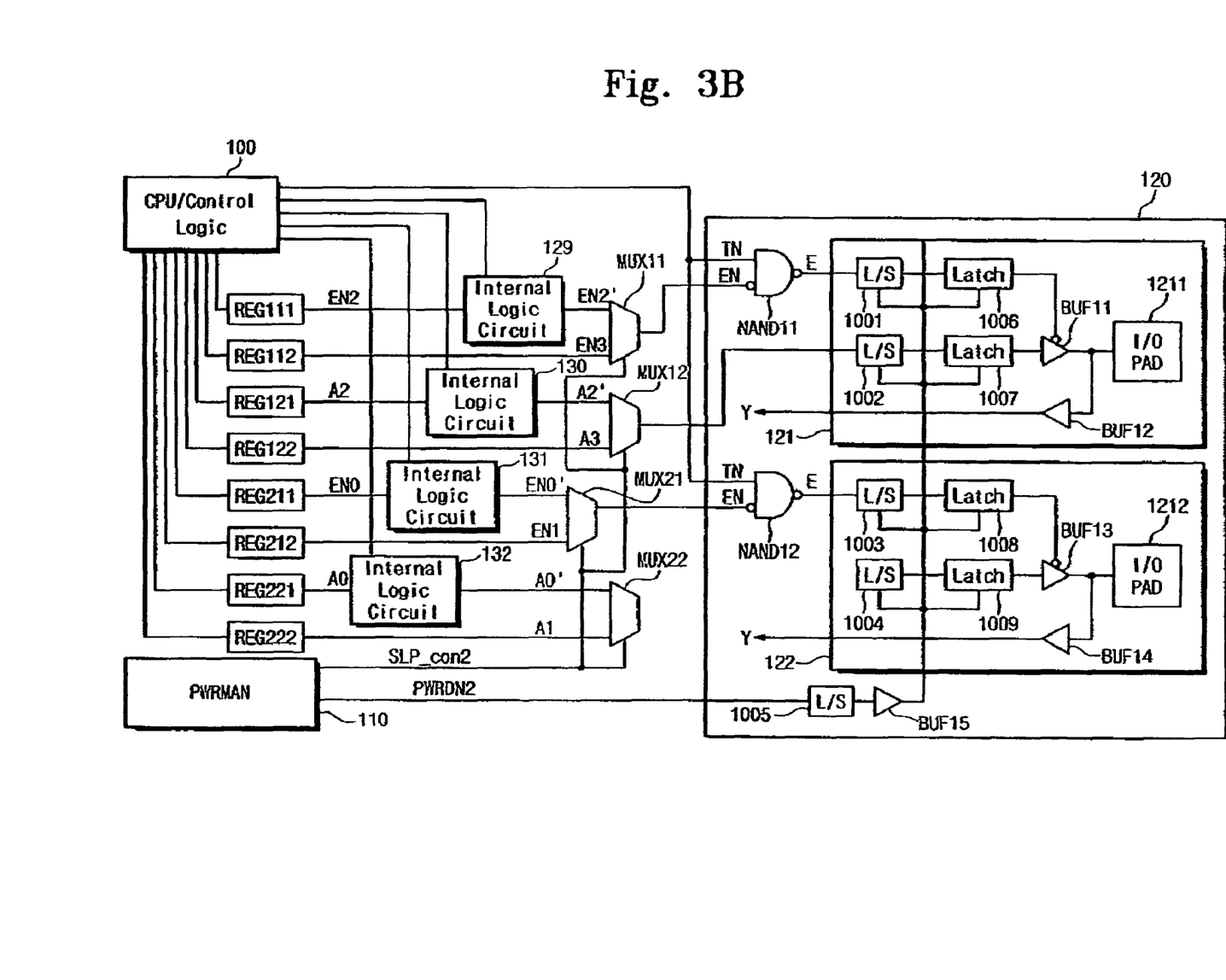
FIG. 3B is a block diagram illustrating another embodiment of a retention input/output device and a power manager in accordance with an aspect of the present invention.

FIG. 3B is a block diagram illustrating another embodiment of a retention input/output device and a power manager in accordance with aspects of the present invention. In the embodiment of FIG. 3B, all of the registers are excluded from the power manager 110. Other structural configurations and operations are substantially the same as those described with respect to the retention input/output device and the power manager of FIG. 3A, so will not be described in detail here.

Figure 3C:
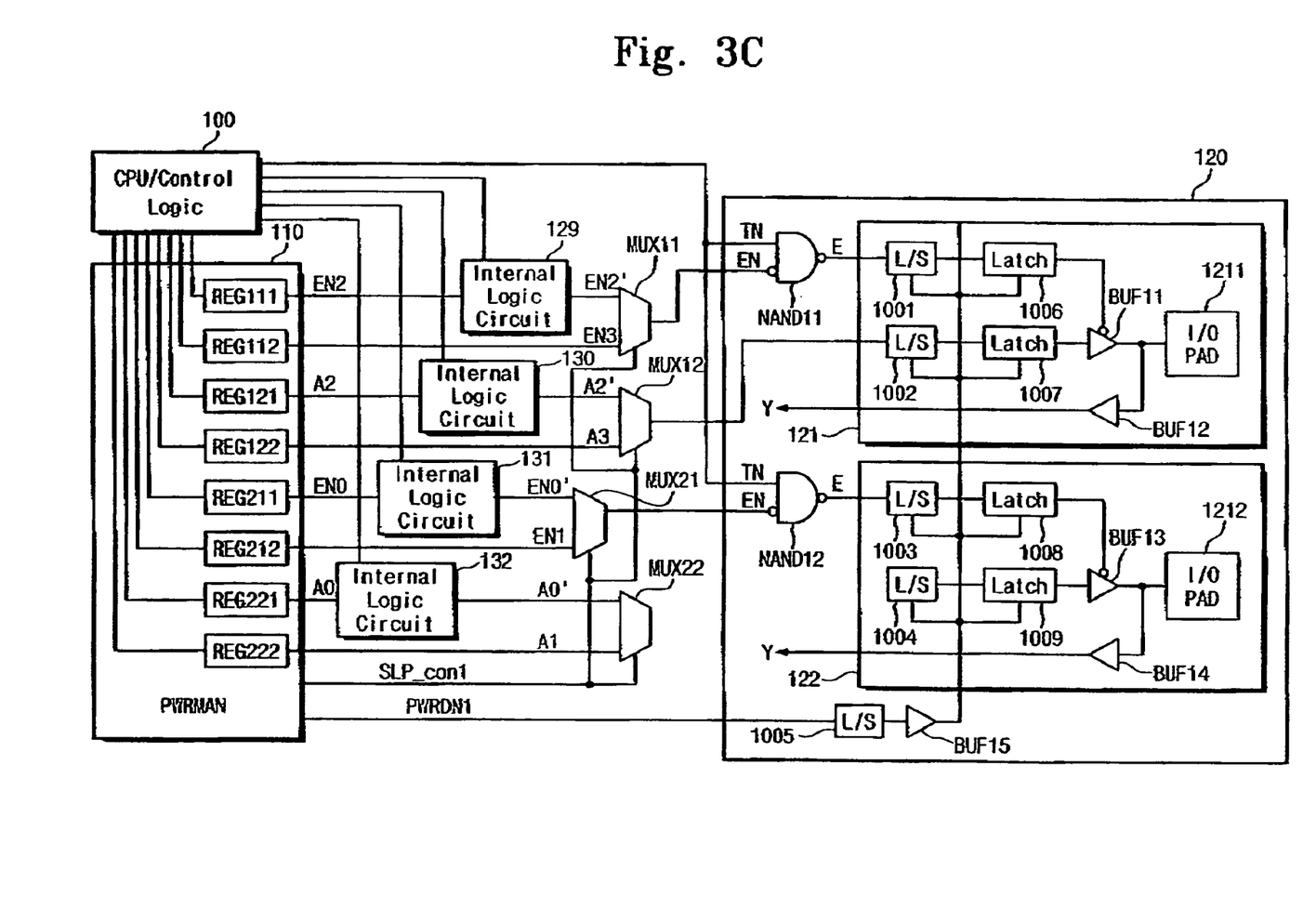
FIG. 3C is a block diagram illustrating still another embodiment of a retention input/output device and a power manager in accordance with an aspect of the present invention.

FIG. 3C is a block diagram illustrating still another embodiment of a retention input/output device and a power manager in accordance with aspects of the present invention. In the embodiment of FIG. 3C, all of the registers are included in the power manager 110. Here generation of Other structural configurations and operations are substantially the same as those described with respect to the retention input/output device and the power manager of FIG. 3A, so will not be described in detail here control signals SLP_con2 and PWRDN2 need not be generated for purposes of operational timings of the input/output cell 121 for the registers REG111~REG122 since they are not disposed in the off region outside of the power manager 110.

Figure 4:
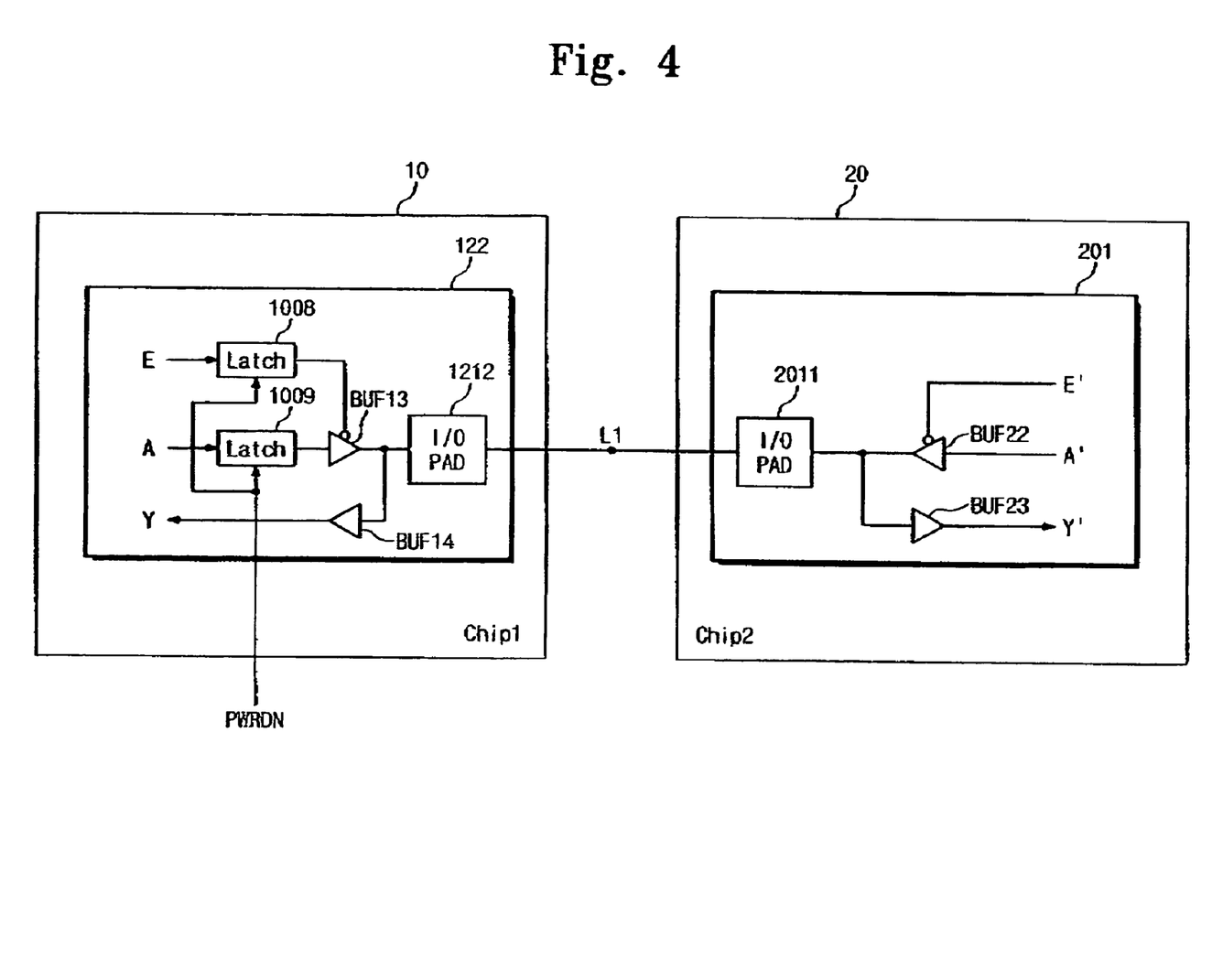
FIG. 4 is a block diagram illustrating an embodiment of an interconnection feature between chips in accordance with an aspect of the present invention.

FIG. 4 is a block diagram illustrating an embodiment of an interconnection feature between chips in accordance with aspects of the present invention.

Referring to FIG. 4, a chip1 10 according to this embodiment includes the input/output cell 122 of the retention input/output device120 discussed above. The input/output cell 122 is same with that shown in FIG. 3A, for example. For convenience of description, the level shifters 1003 and 1004 of the input/output cell 122 are not illustrated in FIG. 4. A chip2 20 includes an input/output cell 201 of a general (non-retention) input/output device. The input/output cell 201 includes an input/output pad 2011 and buffers BUF22 and BUF23.

When a system of the chip1 10 is operating in a normal mode and the input/output cell 122 operates as an output terminal for a signal or data, the latch 1008 bypasses the control signal E by the control signal PWRDN and the buffer BUF13 is turned ON by the control signal E. The latch 1009 bypasses an input signal A by the control signal PWRDN and the input signal A is transferred to the input/output pad 1212 through the buffer BUF13. During this time, the input/output cell 201 of the chip2 20 functions as an input terminal and the buffer BUF22 is turned OFF by a control signal E' input thereto. The signal A output from the input/output pad 1212 of the chip1 10 is transferred to the input/output pad 2011 of the chip2 20. The signal A transferred to the input/output pad 2011 is transferred to an internal logic circuit (not shown) of the chip2 20 by way of the buffer BUF23. Namely, a signal output from the chip1 10 is input to the chip2 20 through interconnection between the pads 1212 and 2011.

When the system of the chip1 10 is operating in the normal mode and the input/output cell 201 of the chip2 20 operates as an output terminal, the buffer BUF22 is turned ON by the control signal E' and a signal A' is provided to the input/output pad 2011 from an internal logic circuit (not shown) of the chip2 20. The signal A' provided to the input/output pad 2011 is transferred to the input/output pad 1212 of the chip1 10. During this time, the input/output cell 122 of the chip1 10 functions to receive as an input the signal and the latch 1008 of the input/output cell 122 bypasses the control signal E using the control signal PWRDN. The control signal E turns the buffer BUF13 OFF. The signal A' input to the input/output pad 1212 is transferred to the internal logic circuit of the chip1 10 through the buffer BUF14. Namely, a signal output from the chip2 20 is input to the chip1 10 by way of interconnection between the pads 1212 and 2011.

When the system of the chip1 10 is in the sleep mode and the input/output cell 122 of the chip1 10 operates as an output terminal before the system turns to the sleep mode, the latch 1008 stores the control signal E using the control signal PWRDN. As the buffer BUF13 is held in an ON state by the control signal E stored in the latch 1008, the input/output cell 122 maintains its output state. The latch 1008 stores the sleep value A1 (selected by the multiplexer MUX12 of FIG. 3A) using the control signal PWRDN. During this time, as the system of the chip1 10 is transitions into the sleep mode, a controller (not shown) of the chip2 20 cannot further input data from the chip1 10. Thus, the controller of the chip2 20 instructs the chip2 20 not to accept data from the chip1 20, putting an interconnection unit L1 between the input/output pads 1212 and 2011 into a state of high impedance (high-Z).

If the interconnection unit L1 becomes high impedance between the input/output pads 1212 and 2011, there would be a leakage current in the buffer BUF14 of the input/output cell 122 which is formed of MOS transistors (not shown). Thus, for the purpose of preventing such a leakage current in the buffer BUF14 of the input/output cell 122, the latch 1009 stores the low or high level value A (i.e., the sleep value A1) that is transferred to the input/output pad 2011 of the chip2 20 by way of the buffer BUF13 and the input/output pad 1212. Then, the interconnection unit L1 between the input/output pads 1212 and 2011 maintains a low or high level value thereon. As the interconnection unit L1 between the input/output pads 1212 and 2011 holds a low or high level value, there is no leakage current through the buffer BUF14 of the input/output cell 122 of the chip1 10. In general, the sleep value A1 is set at a low level and the interconnection unit L1 between the input/output pads 1212 and 2011 holds a low level value. During this time, the sleep value A1 having a low level transferred to the chip2 20 is ignored because the controller of the chip2 20 instructs the chip2 20 not to accept a signal.

When the system of the chip1 10 is in the sleep mode and the input/output cell 122 operates as an input terminal before the system turns to the sleep mode, the latch 1008 stores the control signal E input thereto by the control signal PWRDN. As the buffer BUF13 maintains an OFF state by the control signal E stored in the latch 1008, the input/output cell 122 continues to operate as the input terminal. Namely, the chip1 10 is now operating in the normal mode and inputting a low level signal from the chip2 20. During this time, if the system of the chip1 10 turns to the sleep mode, the chip1 10 is required to be held in the state of inputting the low level signal. Thus, the input/output cell 122 maintains its input state by turning the buffer BUF13 OFF using the control signal E.

The latch 1008 of the input/output cell 122 stores the sleep value A1 using the control signal PWRDN. But, there is no functional effect because the sleep value stored in the latch 1008 does not operate to reduce a leakage current of the buffer BUF14 from maintaining a low or high level value at the interconnection unit L1 between the input/output pads 1212 and 2011, since the buffer BUF13 stays in the OFF state.

Figure 5:
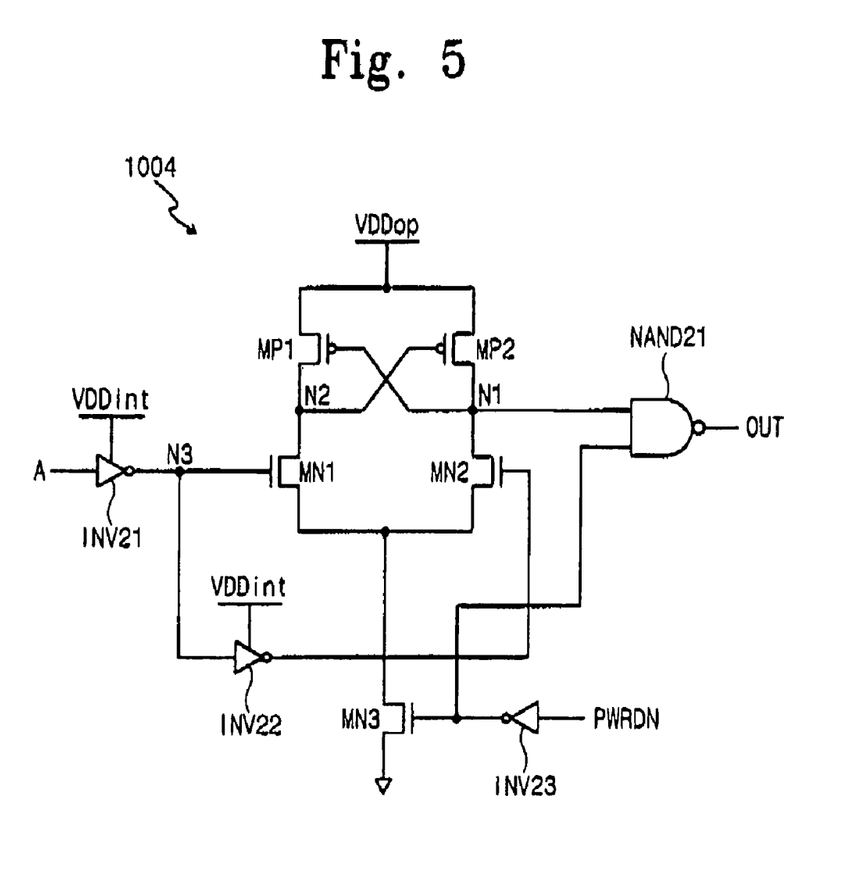
FIG. 5 is a circuit diagram of an embodiment of a level shifter shown in FIG. 3A.

FIG. 5 is a circuit diagram of an embodiment of the level shifter shown in FIG. 3A.

Referring to FIG. 5, the level shifter 1004 of FIGS. 3A through 3C, according to this embodiment, includes PMOS transistors MP1 and MP2, NMOS transistors MN1, MN2, and MN3, and inverters INV21, INV22, and INV23, and a NAND gates NAND21.

The inverters INV21 and INV22 are turned ON or OFF by an internal operation voltage VDDint (hereinafter, referred to as the 'first operation voltage'). The inverter INV23 is turned ON or OFF by an operation voltage VDDop (hereinafter, referred to as the 'second operation voltage') supplied to the retention input/output device. The NAND gate NAND21 is supplied with the second operation voltage VDDop and turned ON or OFF by the second operation voltage VDDop.

Sources of the PMOS transistors MP1 and MP2 are connected to the second operation voltage VDDop in common. A gate of the PMOS transistor MP1 is connected to drains of the PMOS and NMOS transistors MP2 and MN2 through a node N1. A gate of the PMOS transistor MP2 is connected to drains of the PMOS and NMOS transistors MP1 and MN1 through a node N2. The node N1 links to a first input node of a NAND gate NAND21. Sources of the NMOS transistors are connected to a drain of the NMOS transistor MN3 in common. A gate of the NMOS transistor MN1 is coupled to the input signal A through the inverter INV21. A gate of the NMOS transistor MN2 is coupled to the signal A, which is input through the inverter INV21, through the inverter INV22.

The control signal PWRDN is applied to a gate of the NMOS transistor MN3 and a second input node of the NAND gate NAND21. The NMOS transistor MN3 responds to the control signal PWRDN through the inverter INV23 by its gate and is connected to a ground by its source.

When the system is operating in the normal mode, the control signal PWRDN generated from the power manager 110 is activated to a low level. The level shifter 1004 is supplied with the first and second operation voltages. As the control signal PWRDN having a low level is applied to the gate of the NMOS transistor MN3 through the inverter INV23, the NMOS transistor MN3 is turned ON to connect the sources of the NMOS transistors MN1 and MN2 with the ground. The inverted control signal /PWRDN having a high level is applied to the second input node of the NAND gate NAND21 through the inverter INV23, so the NAND gate NAND21 inverts a voltage level of a signal input to its first input node. Namely, the NAND gate NAND21 outputs an inverted voltage of the node N1.

In operation, if the level shifter 1004 receives the signal A having a high level, the high level signal A input thereto is applied to the gate of the NMOS transistor MN1 through the inverter INV21 and to the gate of the NMOS transistor MN2 through the inverters INV21 and INV22.

As the system is operating in the normal mode, the level shifter 1004 is supplied with the second operation voltage VDDop through the sources of the PMOS transistors MP1 and MP2. The gate of the NMOS transistor MN1 of the level shifter 1004 is coupled to a low level signal inverted by the inverter INV21. The low level signal turns the NMOS transistor MN1 OFF. The gate of the NMOS transistor MN2 of the level shifter is coupled to a high level signal through the inverters INV21 and INV22. The high level signal turns the NMOS transistor MN2 ON.

As the NMOS transistor MN2 of the level shifter 1004 is turned ON, a voltage of the node N1 becomes low level. As the voltage of the node N1 is at a low level, the gate of the PMOS transistor MP1 is coupled to the low level signal. Then, the PMOS transistor MP1 is turned ON by the low level signal.

As the NMOS transistor MN1 of the level shifter 1004 is turned OFF, a voltage of the node N2 goes to a high level. Since the voltage of the node N2 is at a high level, the gate of the PMOS transistor MP2 is coupled to the high level signal. Then, the PMOS transistor MP2 is turned OFF by the high level signal.

The PMOS transistors MP1 and MP2 are supplied with the second operation voltages VDDop through their sources. And, since the drains of the PMOS transistors MP1 and MP2 are connected to their corresponding nodes N1 and N2, the nodes connected to the turned-ON transistor goes to a high level voltage.

In detail, the PMOS transistor MP1 is turned ON to charge the node N2 up to high level, while the PMOS transistor MP2 is turned OFF to make the node N1 be low level. As a voltage of the node N1 is low level, the NAND gate NAND21 receives a low level signal through its first input node and the control signal /PWRDN of high level through its second input node. Then, the NAND gate NAND21 outputs a high level signal. This high level signal output from the level shifter 1004 is a signal obtained from converting the high level signal A into a level of the second operation voltage VDDop supplied to the level shifter 1004.

As a result, the level shifter 1004 converts a voltage level of the high level signal A into the high level of the second operation voltage VDDop supplied to the retention input/output device 120, and outputs the converted high level signal to the latch 1009.

The level shifter 1004 outputs a low level signal to the latch 1009 in correspondence with the input signal A of low level. An operation of the level shifter 1004 when the input signal A is low level is the reverse of that when the input signal A is high level, so will not be further detailed here.

If the system turns to the sleep mode from the normal mode, the control signal PWRDN generated from the power manager 110 is activated to be at a high level. While the first operation voltage VDDint is not supplied when the system is being in the sleep mode, the second operation voltage VDDop is continuously supplied to maintain an ON state of the retention input/output device 120 for interfacing with an external device. Thus, the level shifter 1004 is supplied with the second operation voltage VDDop without the first operation voltage VDDint. Since there is no supply of the first operation voltage VDDint, an input of the level shifter 1004 is transitioned into a floating state. But, the NMOS transistor MN3 is turned OFF in response to the control signal /PWRDN having a low level inverted through the inverter INV23, so that the sources of the NMOS transistors NM1 and MN2 are transitioned into open states. And, the NAND gate NAND21 nor-mally outputs a high level signal regardless of a value applied to its first input node because the control signal /PWRDN having a low level is applied to its second input node. As an output of the NAND gate NAND21 maintains the low level signal regardless of a voltage level of the node N1 that is applied to the first input node of the NAND gate NAND21, it is able to prevent a floating state and a leakage current at the level shifter 1004.

Figure 6:
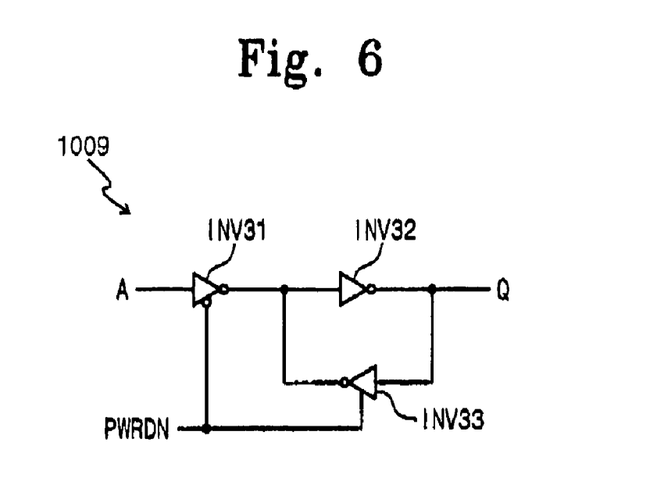
FIG. 6 is a circuit diagram of an embodiment of a latch shown in FIG. 3A.

FIG. 6 is a circuit diagram of an embodiment of the latch shown in FIG. 3A.

Referring to FIG. 6, the latch 1009 according to this embodiment includes inverters INV31, INV32, and INV33. The inverters INV31 and INV33 are turned ON or OFF in response to the control signal PWRDN generated from the power manager 110.

When the system is operating in the normal mode, the control signal PWRDN generated from the power manager 110 is inactivated to be at a low level. The control signal PWRDN having a low level turns the inverter INV31 ON, but turns the inverter INV33 OFF. Then, the latch 1009 inputs the signal A from the level shifter 1004 and outputs the input signal A by way of the inverters INV31 and INV33. In other words, the latch 1009 bypasses the input signal A therethrough.

If the system turns to the sleep mode from the normal mode, the control signal PWRDN generated from the power manager 110 is activated to be at a high level. The control signal PWRDN of low level turns the inverter INV31 OFF, but turns the inverter INV33 ON. Then, the latch 1009 stores the input signal A through the inverters INV32 and INV33.

Figure 7:
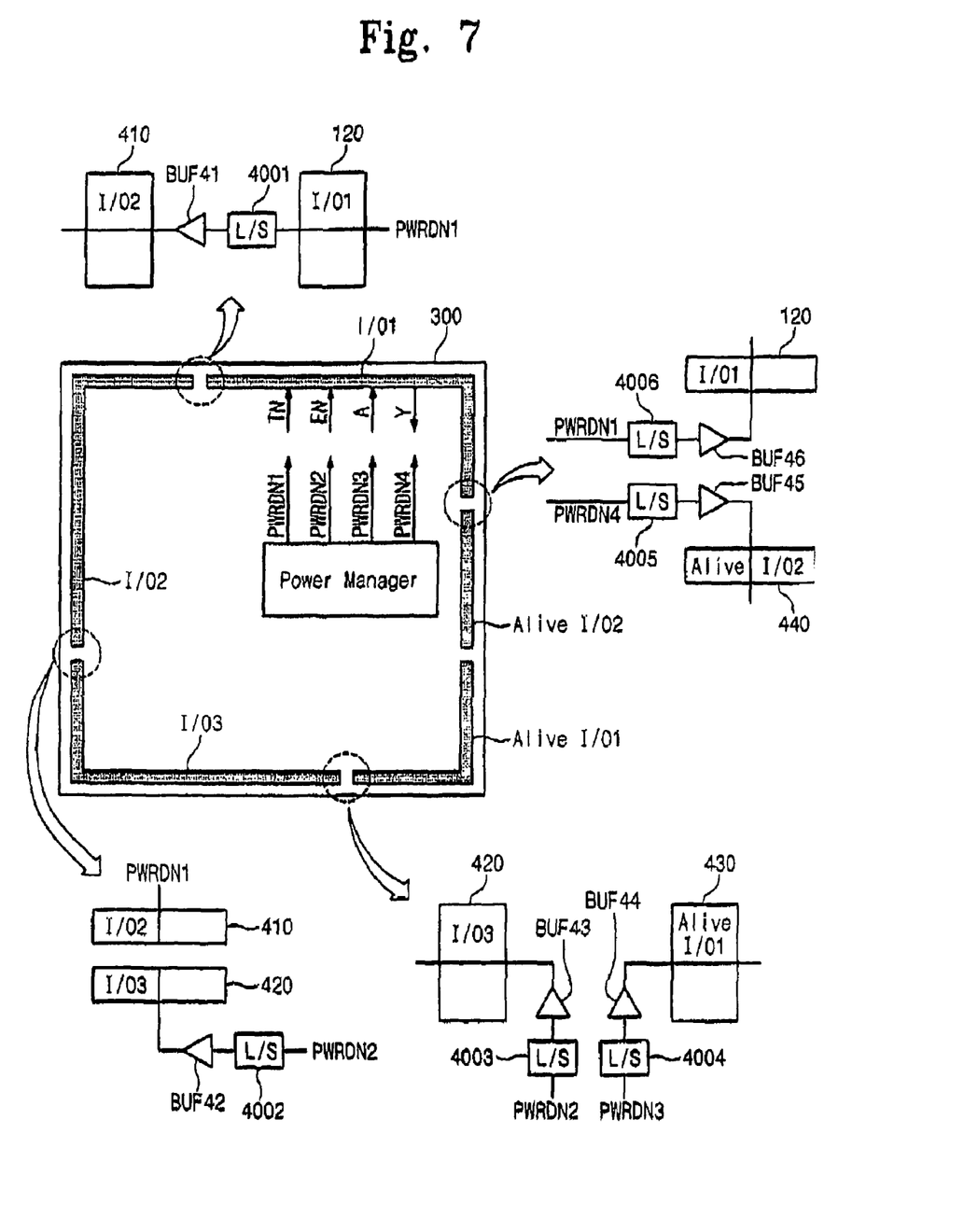
FIG. 7 is a schematic diagram illustrating an embodiment of a chip design pattern of the retention input/output device shown in FIG. 3A.

FIG. 7 is a schematic diagram illustrating an embodiment of a chip design pattern of the retention input/output device shown in FIG. 3A.

Referring to FIG. 7, a chip 300 employing the retention input/output device according to this embodiment is comprised of retention input/output devices 120, 410, and 420, general input/output devices 430 and 440, a plurality of level shifters 4001~4006, and a plurality of buffers BUF41~BUF46.

An operation of the retention input/output device when the system is in the normal or sleep mode will not be further described because it has been detailed with reference to FIGS. 3A and 6.

Chip 300 is able to use the retention input/output devices 120, 410, and 420 or the general input/output devices 430 and 440. The input/output devices 120, 410, 420, 430, and 440 (120~440) receive control signals PWRDN1, PWRDN2, PWRDN3, and PWRDN4 generated from the power manager 110, respectively. If the input/output devices 120~440 are different from each other in operation voltage, a level shifter 4001 can be interposed, for example between the input/output devices 120 and 410, in order to transfer the control signal PWRDN1 from the input/output device 120 to the input/output device 410. Corresponding to the different operation voltages for the input/output devices 120~440, the control signals PWRDN1~PWRDN4 can be generated at different voltage levels from each other and provided independently to the input/output devices.

The retention input/output devices 120 and 410 correspond to the case of transferring the control signal PWRDN1, which is generated from the power manager 110, between the input/output devices different from each other in operation voltage. When in the chip 300, the retention input/output devices 120 and 410 are different from each other in operation voltage, the control signal PWRDN1 generated from the power manager 110 is converted into the operation voltage to be supplied to the retention input/output device 120 through the level shifter 4006. And, the converted control signal PWRDN1 is transferred to the retention input/output device 120 by way of the buffer BUF46. The level shifters 1001~1004 and the latches 1006~1009 (see FIG. 3A), of the retention input/output device 120, are controlled by the level converted control signal PWRDN1.

In order to supply the retention input/output device 410 with the control signal PWRDN1 supplied to the retention input/output device 120, a voltage level of the control signal PWRDN1 is converted into the operation voltage level of the retention input/output device 410. Thus, the chip 300 includes the level shifter 4001 and the buffer BUF41 between the retention input/output devices 120 and 140, and converts the control signal PWRDN1, which is provided to the retention input/output device 410, into the operation voltage for the retention input/output device 410. The converted control signal PWRDN1 is transferred to the retention input/output device 410 by way of the buffer BUF41. The level shifters and latches (not shown) of the retention input/output device 410 are controlled by the control signal PWRDN1.

The retention input/output devices 410, 420, 430, and 440 (410~440) are operable in the condition with different operation voltages from each other and with the control signals PWRDN1~PWRDN4 corresponding to the different operation voltages. The retention input/output device 410 is different from the retention input/output device 440 in operation voltage. The retention input/output device 410 is supplied with the control signal PWRDN1, which is also supplied to the retention input/output device 120, by way of the level shifter 4001 and the buffer BUF41.

Otherwise, the retention input/output device 420 is supplied with the control signal PWRDN2 from the power manager 110 by way of the level shifter 4002 and the buffer BUF42. In other words, the power manager 110 generates the control signals PWRDN1 and PWRDN2 each corresponding to the operation voltage levels of the retention input/output devices 120 and 420, respectively, and transfers the control signals PWRDN1 and PWRDN2 to the retention input/output devices 120 and 420, respectively. The retention input/output device 410 is supplied with the control signal PWRDN1, which is also supplied to the retention input/output device 120, by way of the level shifter 4001 and the buffer BUF41. But the retention input/output device 420 is directly supplied with the control signal PWRDN2 from the power manager 110 by way of the level shifter 4002 and the buffer BUF42.

The level shifters and latches (not shown) of the retention input/output devices 410 and 420 are each controlled by the control signals PWRDN1 and PWRDN2. The retention input/output device 420 and the general input/output device 430, and retention input/output device 120 and the general input/output device 440 are configured for directly accepting the control signals PWRDN1~PWRDN4 from the power manager 110 in correspondence with the different operation voltages applied thereto and their respective operation voltage requirements. Although not detailed in FIG. 7, the general input/output devices 430 and 440 can be configured to input the same control signal, as with the retention input/output devices 120 and 410, from the power manager 110, or their respective control signals can be different from each other as with the retention input/output devices 410 and 420.

When the system is in the sleep mode, the general input/output device 440 is used for transferring a wakeup signal to the power manager 110 (on block or on region) in order to return the system to the normal mode. On block or on region means internal to the power manager 110. While off block or off region means external to the power manager 110.

When the system is transitioned into the sleep mode, most blocks of the chip 300 are turned OFF without a power supply, but few input/output devices are substantially operating in the normal mode for transferring the wakeup signal to the power manager 110 in order to return the system to the normal mode. Such few input/output devices are used with the general input/output device 440. If the system turns to the normal mode from the sleep mode, the wakeup signal for enabling the system to return into the normal mode is generated from an ON-state block (not shown) and transferred to the power manager 110 (on block) through the general input/output device 440. Responding to the wakeup signal, the power manager 110 returns the OFF-state blocks of the chip 300 to the normal mode.

In the meantime, at least one of the retention input/output devices 120, 410, or 420 is also able to transfer the wakeup signal, which is generated from an ON-state block (not shown) outside of the chip for the purpose of returning the system to the normal mode, to the power manager 110. When the system is in the sleep mode, the buffer BUF13 of the input/output cell 122 shown in FIG. 3A is turned OFF and the wakeup signal is transferred to the input/output pad 1212 of FIG. 3A from the ON-state block outside of the chip. The transferred wakeup signal is applied to internally through the buffer BUF14 of FIG. 3A. For instance, the wakeup signal for returning the system to the normal mode is generated from the ON-state block outside of the chip and transferred to the input/output pad 1212 of the retention input/output device shown in FIG. 3A. The wakeup signal transferred to the input/output pad 1212 is applied to the power manager 110 of (on block) through the buffer BUF14 of FIG. 3A.

The general input/output device 430 can be used by a block, e.g., an analog-to-digital converter, which is designed to receive an analog signal.

As a result, the registers REG111~REG122 can be included in an off region outside of the power manager 110 if their stored values are irrelevant to the wakeup operation. Further, as the retention input/output device 120 needs to be normally supplied with power, it is unnecessary to be equipped with an awake multiplexer for preventing a floating state of the input, the general multiplexers MUX21 and MUX22 are available in an off region of the retention input/output device 120. Moreover, in the sleep mode of the system, since the retention input/output device 120 stores the sleep value A1 of the register REG222 into the latch 1009, it is able to hold the sleep value A1 during the sleep mode although the register REG222 is placed in the off region (see FIG. 3A).

Consequently, as the retention input/output device 120 is operable without the awake multiplexer and the power manager 110 is operable without the registers REG111~REG122, it reduces the size of circuits required to maintain the ON state in the sleep mode of the system. Thus, it effects reduction of power consumption and leakage current in the sleep mode of the system.

While it can be regarded that the additional latches 1008 and 1009 of the input/output cell 122 enlarges a circuit size to increase a leakage current, these latches 1008 and 1009 occupy a very smaller circuit area relative to the conventional case of including the awake multiplexer. Additionally, the transistors employed in the latches 1008 and 1009 have high threshold voltages and are driven by the operation voltage supplied to the input/output device. The operation voltage supplied to the retention input/output device is higher than an internal voltage. In general, a transistor flows a smaller leakage current therethrough as its threshold voltage is higher. Therefore, rather than transistors driven by the internal voltage, the transistors of the latches 1008 and 1009 driven by the operation voltage of the retention input/output device operate in small leakage currents because of their high threshold voltages. As a result, even such additional latches of the retention input/output device dissipate a minute amount of leakage current therethrough.

In summary, the SOC system including the retention input/output device according to aspects of the present invention is advantageous to achieving low power and small leakage current, because it can be structured with a smaller size of circuits for the sleep mode.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description and the embodiments thereof.

What is claimed is:

1. A system-on-chip comprising:
a controller configured to generate a first input/output control signal to determine an input/output state in a normal mode, a second input/output control signal to determine the input/output state in a sleep mode, a normal value, and a sleep value;
a first register configured to store the first input/output control signal;
a second register configured to store the second input/output control signal;
a third register configured to store the normal value;
a fourth register configured to store the sleep value;
a first selector configured to select an alternative one from the first and second input/output control signals in accordance with an operation mode;
an internal logic circuit configured to operate in the normal mode under the control of the controller and configured to generate a signal to be transferred to an external chip in response to the normal value from the third register;
a second selector configured to select an alternative one from outputs the fourth register and the internal logic circuit in accordance with the operation mode;
a power manager configured to control the first and second selectors; and
a retention input/output device configured to store outputs of the first and second selectors in response to the power manager when the normal mode transitions to the sleep mode,
wherein the input/output state of the retention input/output device is held by the output of the first selector when the normal mode transitions to the sleep mode.

2. The system-on-chip as set forth in claim 1, wherein the retention input/output device comprises an input/output pad that is driven by the output of the second selector when the retention input/output device has an output state prior to the sleep mode.

3. The system-on-chip as set forth in claim 1, wherein the first, second, third, and fourth registers are included in an off region and are not provided power from a power supply in the sleep mode.

4. The system-on-chip as set forth in claim 1, wherein the first, second, third, and fourth registers are included in an on region and are provided power from a power supply in the sleep mode.

5. The system-on-chip as set forth in claim 4, wherein the on region is internal to the power manager.

6. The system-on-chip as set forth in claim 1, wherein the first, second, third, and fourth registers are included in the power manager, wherein the signals and values stored therein are required in connection with wakeup.

7. The system-on-chip as set forth in claim 1, wherein the power manager is configured to generate a power control signal, latch values input from the first and second selectors before the sleep mode when the normal mode transitions to the sleep mode, and control the retention input/output device to generate a predetermined level signal.

8. The system-on-chip as set forth in claim 1, wherein the retention input/output device comprises an input/output cell controlled with the input/output state by the first and second input/output control signals.

9. The system-on-chip as set forth in claim 8, wherein the input/output cell comprises:
an input/output pad;
a first latch configured to latch the output of the first selector transferred through a first level shifter;
a second latch configured to latch the output of the second selector transferred through a second level shifter; and
a buffer controlled by a value of the first latch, and configured to transfer a value of the second latch to the input/output pad.

10. The system-on-chip as set forth in claim 9, wherein each of the first and second latches is configured to bypass or store an output of the corresponding level shifter in correspondence with the power control signal.

11. The system-on-chip as set forth in claim 9, wherein each the first and second latches is configured to bypass an output of the corresponding level shifter in the normal mode.

12. The system-on-chip as set forth in claim 9, wherein each the first and second latches is configured to latch an output of the corresponding level shifter in the sleep mode.

13. The system-on-chip as set forth in claim 9, wherein the first and second level shifters are configured to generate predetermined level signals from the power control signal when the normal mode transitions to the sleep mode.

14. The system-on-chip as set forth in claim 1, wherein the first and second selectors, the internal logic circuit, and the controller are configured to be interrupted with power from the power manager when in the sleep mode.

15. A system-on-chip comprising:
a plurality of input/output devices, comprising at least one retention input/output device and at least one non-retention input/output device;
a power manager configured to generate two or more power control signals configured to control the plurality of input/output devices; and
at least one selector configured to select from among the two or more power control signals in accordance with an operation mode, including a normal mode and a sleep mode;
wherein the at least one retention input/output device is configured to store outputs of the at least one selector to maintain an input/output state of the at least one retention input/output device when the normal mode transitions to the sleep mode.

16. The system-on-chip as set forth in claim 15, wherein the two or more power control signals comprise a plurality of power control signals having different voltage levels, and each of the plurality of input/output devices is configured to receive one of the power control signals having an appropriate power level.

17. The system-on-chip as set forth in claim 15, further comprising a level shifter interposed between two input/output devices from the plurality of input/output devices, through which a power control signal configured to control one of the two input/output devices is transferred to the other of the two input/output devices.

* * * * *